June 17, 1969     J. F. CHESSER     3,450,805

PROCESS OF COOLING A BLOWN ARTICLE

Filed Aug. 29, 1966

INVENTOR
J. F. CHESSER

BY *Young & Quigg*

ATTORNEYS

United States Patent Office 3,450,805
Patented June 17, 1969

3,450,805
PROCESS OF COOLING A BLOWN ARTICLE
John F. Chesser, Brownwood, Tex., assignor to Phillips Petroleum Company, a corporation of Delaware
Filed Aug. 29, 1966, Ser. No. 575,822
Int. Cl. B29c 17/04
U.S. Cl. 264—28                                                  4 Claims

ABSTRACT OF THE DISCLOSURE

The cycle time in the blow molding of hollow thermoplastic articles is speeded up without causing distortion to the article being formed by first expanding a parison or sheet or the like against mold walls by means of air and thereafter circulating through the hollow object a mixture of air and a vapor from a warmed liquefied gas. Initial blowing may be done with air at ambient temperature or air which has been passed through the mixing zone and cooled by contact with the cold walls of the mixing zone. Distortion of the inner surface of the formed article which can occur if $CO_2$ and the like is introduced directly against the thermoplastic material is avoided.

---

Figure 1:
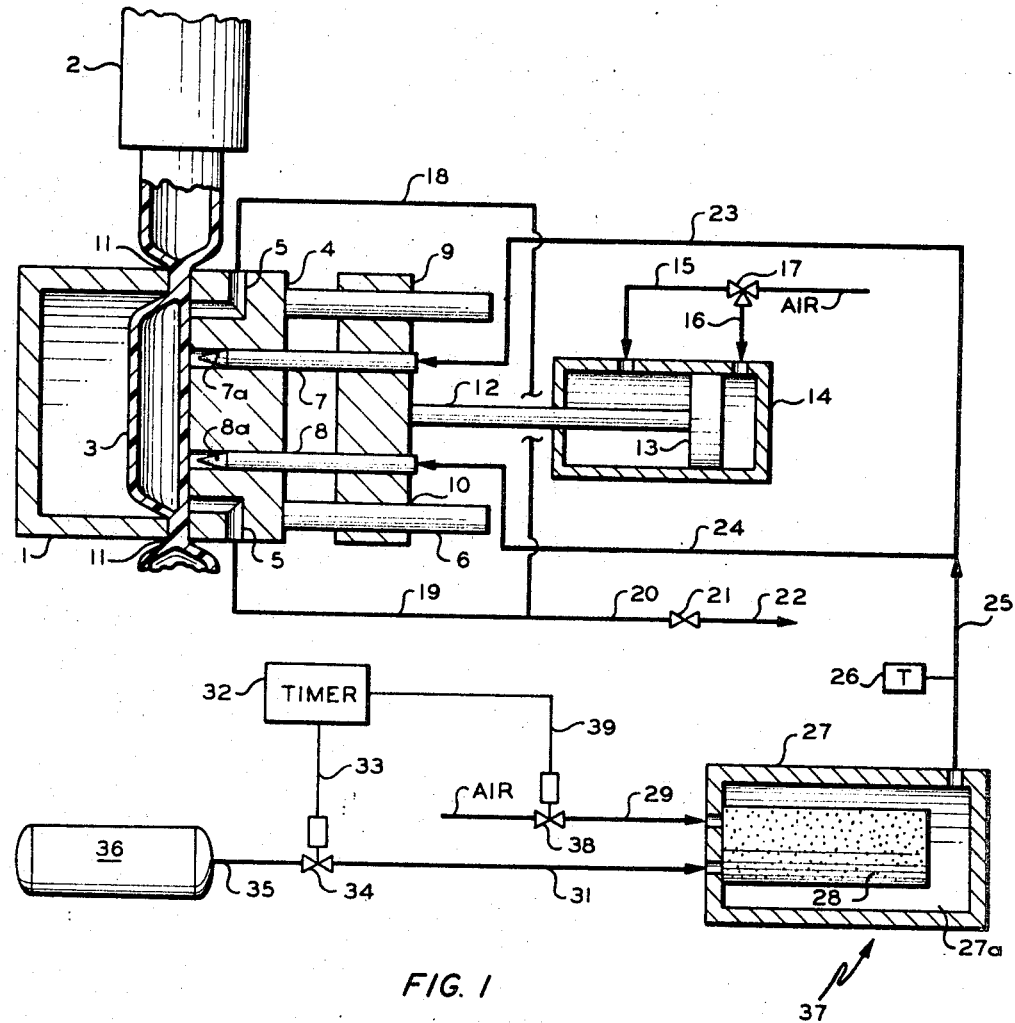

This invention relates to molding of plastics. In another aspect, this invention relates to a novel method of forming and cooling a molded object. In still another aspect, this invention relates to a novel method of and apparatus for blow molding.

The process of forming articles, particularly blown articles, from thermoplastic materials comprises first bringing the thermoplastic material into a plastic or moldable condition. A thermoplastic material is one that is hard at normal or room temperature and rendered plastic and moldable under elevated temperatures and pressures. Examples of some thermoplastic materials are: polyethylene, polypropylene and copolymers thereof, other 1-polyolefins, polystyrene, and polyvinyl chloride, and the like. Thermoplastic materials used for forming articles are brought to a plastic or moldable condition in two basic ways. In the first way, the material in a comminuted form is subjected simultaneously to heat and pressure and admixing. In the present instance, the means shown for accomplishing this purpose is not part of the present invention, but can be any plasticizing means, such as an extruder or injection molding machine, having a parison extrusion die directly communicating therewith. The second way is used only when molding a preformed parison that has been initially formed to yield a desirable shape and then subsequently cooled and stored. The preformed parison is then heated in an oven immediately before injection into the molding device.

A commercially useful process to which the instant invention is applicable comprises rendering the plastic material molten by an injection molding machine. Such plastication is obtained by forcing the plastic material by a ram through a heated cylinder having a torpedo inserted therein. The molten material is then fed from the injection nozzle to the parison extrusion die and the parison (tubular form) is extruded from said die by the force exerted by said ram. When an extruder is used as the plasticating means, the force supplied by the extruder's auger or screw is utilized to extrude the parison from the die. When using an extruder, the continuous operation of same is maintained by use of at least two parison dies being fed alternately from the extruder. A less used method utilizes an extruder feeding molten plastic material to a reservoir chamber, wherein a piston intermittently forces material therefrom to a parison extrusion die.

The parison is extruded downward from the die, the mold closes around the parison, sealing together the upper and lower ends of the parison by clamping same together. The parison is expanded by positive pressure to the shape of the mold. After the article has taken shape and the mold is opened, the article is then severed from the parent material at the die. Before the thermoplastic article can be removed from the mold, it must be cooled and hardened so that it will not be damaged during the removal process. One method of cooling and thereby hardening a formed thermoplastic article is by utilizing a cooled mold such as one having a cooling fluid flowing through passages in the mold sections. Such a method has been found to be slower than is desirable owing to the considerable length of time required for cooling the molten plastic. Another method employs a cooling liquid which is circulated within the blown or expanded article by which it is quickly chilled and hardened, thus permitting the mold to be opened and the blown article to be removed without cooling the entire mold. However, problems occur using this method because the cooling liquid upon coming into contact with the hot formed thermoplastic material will cause the inside surfaces to cool more rapidly than the outside surfaces. This will result in the formation of blisters or stressed and warped areas due to the non-uniform contraction of the material during the cooling operation.

Accordingly, one object of this invention is to provide a novel method of and apparatus for reducing the cooling cycle time in blow molding operations.

Another object of this invention is to provide a novel method of and apparatus for forming a molded object in a blow molding operation.

Another object of this invention is to provide a novel method of and apparatus for cooling a molded object.

Other objects and advantages of this invention are apparent from the study of this disclosure.

According to one aspect of this invention, air from 40 to 70° F. is first introduced into the interior of a heated tube or against one side of a heated substrate or heated preformed parison of thermoplastic material clamped in a mold cavity to expand said tube, substrate, or preformed parison to conform to the shape of the inner walls of said mold that are in contact with said expanded tube, substrate or preformed parison. When the said thermoplastic material is thus formed, a mixture of air and carbon dioxide is then passed through the mold cavity to cool and thereby harden the said thermoplastic material. The temperature of the air-$CO_2$ mixture will be maintained from about 0 to 45° F. depending on the type of and thickness of the thermoplastic material to be cooled. The air-$CO_2$ mixture is obtained by evaporating liquid carbon dioxide in a heat exchange zone wherein the said liquid $CO_2$ is contacted with warm air. This process cools the air and warms the $CO_2$ to form a cool gaseous mixture. The temperature of the gaseous mixture can be adjusted by varying the relative amounts of air and liquid $CO_2$ introduced into the heat exchange zone. This method of cooling the formed thermoplastic material will prevent the blistered and warped areas that can occur when an extremely cold liquid such as liquid $CO_2$ is utilized to directly cool the formed article. This method also prevents freeze-ups in the cooling line from the cooling liquid source to the mold that occur when an extremely cold liquid, such as liquid $CO_2$, comes in contact with any water-vapor that is collected in the said line.

Most liquefied gases can be used in this invention. For example, liquefied petroleum gases or nitrogen can be used. However, the explosive nature of liquefied petroleum gas would render it undesirable. Liquid $CO_2$ is preferred because of its availability and its unique physical characteristics and chemical inertness.

According to another aspect of this invention, a novel apparatus for cooling air and mixing air and $CO_2$ is provided by passing air and liquid $CO_2$ to a mixing and evaporation vessel comprising an inner permeable evaporation means whereby air is cooled by liquid $CO_2$ to form an air-$CO_2$ gaseous mixture, the said inner permeable evaporation zone then collects any solid $CO_2$ that forms, and holds it in contact with air until it completely sublimes; an outer mixing zone which totally encloses said inner permeable evaporation zone, and collects the gases from the said inner zone. The resulting gaseous mixture is then passed through the internal mold cavity to cool the expanded thermoplastic material. Forming air used to expand the heated tube, substrate, or preformed parison in the next cycle is then introduced into the cooled inner permeable evaporation zone in the mixing and evaporation vessel, and passes on through the outer collection means into the mold cavity. In this manner, air from 50 to 80° F. can be cooled to 30 to 45° F. by passing it through the cooled mixing and evaporation vessel which is cooled from the last air-$CO_2$ mixing step. This step will also warm the mixing and evaporation vessel, and thereby keep it from freezing or frosting up which in turn will thereby allow continuous operation. When the device is operated in this manner, it is possible to maintain both the forming air and the cooling air-$CO_2$ mixture at about 30° F. In this manner, the forming air not only forms the article, but serves to precool the article as well. For example, it was found that the internal forming air which entered the mold cavity at 30° F. for a 20 second forming operation left the mold at over 100° F.

According to another aspect of this invention, a novel tube puncturing device is provided for introducing forming and cooling fluid into the interior of a heated tube in a blow molding operation. This tube puncturing device comprises an elongated tube with one internal conduit therethrough which is threaded on one end and pointed on the other with one or more openings near the pointed end. These openings are arranged around the periphery of the point bevel, and will allow the flow of forming and cooling fluid to spread into the interior of the tube without impinging in one spot. This is an improvement over conventional needles having openings centered at the beveled end thereof for example. The fluid flow through these needles will strike the opposite wall of the heated tube and will thereby cause that spot to cool more rapidly than the surrounding area which in turn causes warping and blistering. The device of this embodiment will prevent this blistering by causing the flow of forming and cooling fluid to spread and diffuse within the heated tube and to thereby divert the direct flow of the fluid from the wall opposite the needle point.

Figure 2:
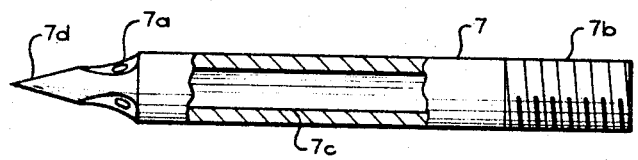

This invention will be better illustrated by the annexed drawing in which FIGURE 1 is a sectional drawing of the apparatus of this invention, and FIGURE 2 is a drawing partly in section of another embodiment of this invention.

As shown in FIGURE 1, 1 and 4 comprise a pair of complementary mold elements which cooperate to form an interior mold cavity to thereby define the final shape of the blown portion of an article. Conventional extrusion nozzle 2 extrudes the tube 3 of thermoplastic material and injects sufficient air to slightly expand the tube. The extruded tube 3 passes between split halves 1 and 4 of the two-piece mold. Mold halves 1 and 4 cooperate to pinch off and thus seal the upper and lower portions of tube 3 at points 11. Needles 7 and 8 are inserted within mold half 4 and are affixed to movable block 9. Needles 7 and 8 will be discussed in more detail in connection with the discussion of FIGURE 2. Piston rod 12 is operatively connected to movable block 9. Guide rods 6 are inserted within openings 10 of movable block 9, and control lateral movement thereof. When valve 17 is turned to a first position, air flows through conduit 16 and forces piston 13 to the opposite end of cylinder 14 thereby causing movable block 9 to move toward mold half 4. Needles 7 and 8 then puncture sealed tube 3. Timer 32 then actuates valve 38, and air is introduced into conduit 29 and flows through mixing and evaporating vessel 37 by way of inner permeable evaporation means 28 and mixing zone 27a. Timer 32 is connected to valve 38 by control lead 39. The air then flows through conduit 25, conduits 24 and 23, and needles 7 and 8, and out openings 7a and 8a into the interior of parison 3 to thereby expand parison 3 to conform to the interior portions of the mold. The forming air causes the wall of the formed object adjacent to lines 5 to rupture. The forming air then passes through lines 5 and exerts pressure on vent valve 21. The molded article is then vented through lines 5, 18, 19 and 20 when the pressure on vent valve 21 reaches a predetermined pressure. After the air has passed into the parison for a predetermined time, such as 30 seconds, liquid $CO_2$ is passed from storage tank 36 through line 35, valve 34, and line 31 into the inner permeable evaporation zone 28. Valve 34 is operatively connected to timer 32 by control lead 33. After the liquid $CO_2$ has mixed with the air from line 29 for a preset time, such as 20 seconds, timer 32 will turn valve 34 to its initial position and thereby stop the flow of liquid $CO_2$ therethrough. The mixture of cold gases flows through the permeable wall section of the inner permeable evaporation means 28 and is collected in collection zone 27a which is defined by collection and mixing means 27 which completely encloses the inner permeable evaporation means 28. The cold gases then flow out to needles 7 and 8 via conduits 25, 24, and 23. The temperature of the resulting mixture is read by temperature sensing means 26. When the object is cooled, valve 17 is turned to a second position and air flows through conduit 15 to cylinder 14 and forces piston 13 to the opposite end of cylinder 14. In this manner, needles 7 and 8 are retracted from mold half 4. Mold halves 1 and 4 are then disconnected and the formed article is then easily removed.

FIGURE 2 is an illustration partly in section of needle 7 in the apparatus of FIGURE 1. Needle 8 is identical to needle 7. Conduit 7c is contained within the needle body, and is in communication with outlets 7a. The needle may contain several outlets, but only 2 are shown for the purpose of illustration. These outlets are arranged around the periphery of the point bevel 7d. This arrangement will cause the fluid flowing through 7c to diffuse at outlet 7a, which in turn will prevent blistering of the tube wall opposite the needle point normally caused by impingement of flow thereon. Threaded portion 7b is on the end opposite the needle point. This facilitates quick removal of the needle from movable block 9 during needle replacement and cleaning operations.

It must be noted that the invention is not intended to be limited by the drawing. For example, any blow molding apparatus which forms an object from a heated tube, substrate, or preformed piston may utilize this forming and cooling method and apparatus.

I claim:
1. A process of blow molding comprising:
 (a) heating a tube, substrate, or preformed parison of thermoplastic material and placing said tube, substrate, or preformed parison into a mold;
 (b) introducing air into said tube or against one side of said substrate or said preformed parison to cause said tube, substrate or preformed parison to expand and conform to the shape of the inner walls of said mold;
 (c) venting the air from the expanded thermoplastic material;
 (d) forming a 0 to 45° F. mixture of air and a vapor from a warmed liquefied gas by mixing liquefied gas and air in a mixing and evaporating zone to form a resultant gaseous mixture; and (e) flowing said mixture into the expanded thermoplastic material to thereby cause the said thermoplastic material to cool and harden.

2. The process of claim 1 wherein the air used to expand the thermoplastic material to conform to the shape of the mold is first cooled by passing said air to the mixing and evaporation zone after said gaseous mixture has been removed therefrom.

3. The process of claim 2 wherein said liquefied gas is liquid $CO_2$.

4. The process of claim 2 wherein the air and the air-$CO_2$ mixture leaving said mixing and evaporation zone are maintained from 30 to 45° F.

References Cited

UNITED STATES PATENTS

| | | | |
|---|---|---|---|
| 3,338,998 | 8/1967 | Di Settembrini | 264—94 |
| 2,834,154 | 5/1958 | Koob | 49—9 |
| 3,065,501 | 11/1962 | Gasmire | 18—5 |
| 3,246,062 | 4/1966 | Scott et al. | 264—98 |
| 3,127,458 | 3/1964 | Scott | 264—98 |
| 3,233,416 | 2/1966 | Rainwater. | |

ROBERT F. WHITE, *Primary Examiner.*

A. M. SOKAL, *Assistant Examiner.*

U.S. Cl. X.R.

18—5, 19; 264—93, 98